Feb. 8, 1966   H. F. WALDMANN   3,234,143
WATER-IN-OIL EMULSION AND METHOD FOR THE PREPARATION THEREOF
Filed May 21, 1962   3 Sheets-Sheet 1

INVENTOR.
Hans F. Waldman
BY Charles A. Huggett
Attorney

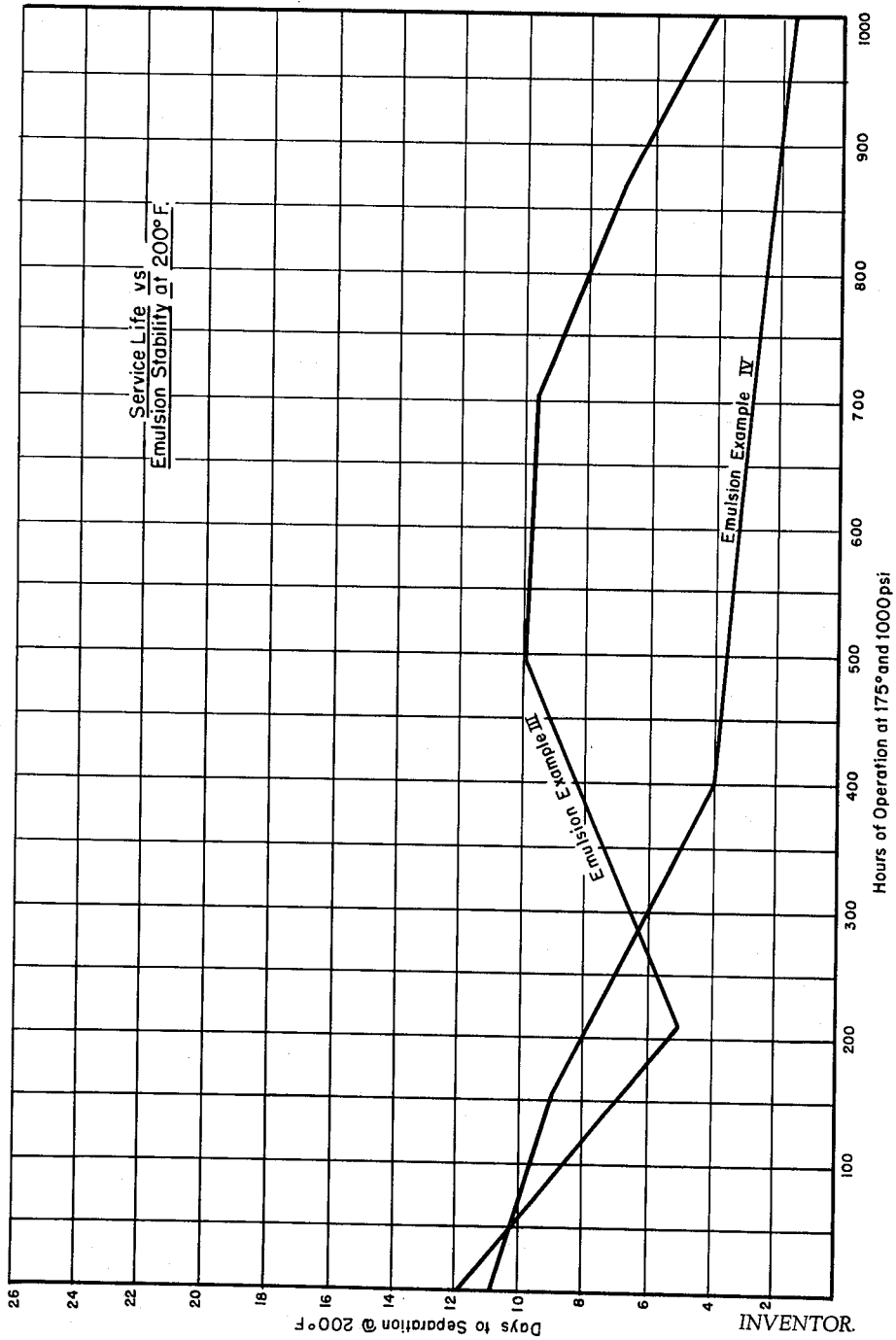

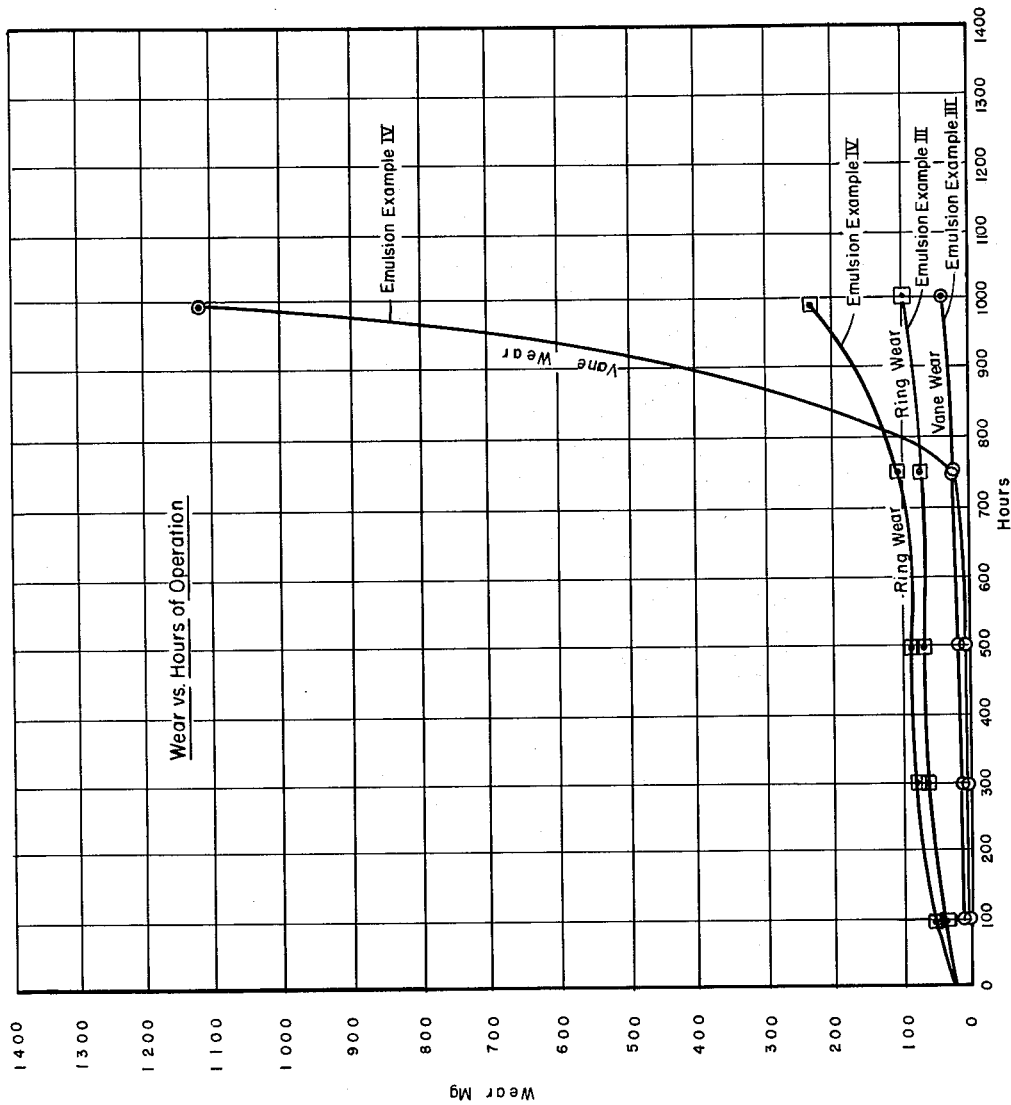

United States Patent Office 3,234,143
Patented Feb. 8, 1966

3,234,143
WATER-IN-OIL EMULSION AND METHOD FOR
THE PREPARATION THEREOF
Hans F. Waldmann, Glassboro, N.J., assignor to Socony
Mobil Oil Company, Inc., a corporation of New York
Filed May 21, 1962, Ser. No. 196,336
6 Claims. (Cl. 252—309)

This invention relates to an improved method of preparing a water-in-oil emulsion useful as a fire-resistant hydraulic oil and metalworking oil.

Hydraulic systems are being employed more and more extensively in industry to operate machinery from remote locations and with comparative ease. Various types of liquids have been employed as the operative fluid in these hydraulic systems; however, for one reason or another, these liquids have been found to lack required properties. Various oils, such as mineral oils, have found much favor in the past; however, many applications of hydraulic systems cannot tolerate leaks with such a pressure transmitting medium since the oil, under high pressure, may then find its way to heat and flame where explosion or combustion occurs. Hydraulic systems are used in metalworking and treating plants and leaks in the system have caused serious accidents in the past.

Water-in-oil emulsions have been tried in the prior art to provide a useful hydraulic oil that had the benefit of low flammability. As long as these emulsions remain unbroken with the water uniformly dispersed throughout the oil in the form of fine particles, the fire resistance remains high. However, adequate stability and anti-wear properties of the emulsion have not been present in prior formulations. The water particles tend to agglomerate in clusters and to settle to the lower part of the reservoir, thereby impairing the fire resistance of the fluid remaining in the upper part. In some cases, an upper layer of clear oil possessing no fire resistance whatsoever will result. In more severe cases, the water may coalesce into larger droplets which eventually will settle out and form a layer of free water on the bottom. In addition to impairment of fire resistance, the latter condition is objectionable in that free water may enter the circulating system and may cause corrosion of lines and working parts and rapid wear of pump parts due to lack of lubrication. It is essential, therefore, that the water particles be dispersed in the oil so that good lubricity is obtained. It is further essential that the water particles be small and uniformly distributed throughout the oil to keep corrosion tendency to a minimum and provide the minimal amount of metal wear. Many prior art emulsions have employed commonly available surface active agents such as esters or partial esters of fatty acids and glycols or polyglycols. Familiar examples are esters of sorbitol and sorbitan sold under the trade names "Spans" and "Tweens," the latter identifying ethylene oxide derivatives of such esters. However, these agents cannot be employed in alkaline systems since under conditions of high temperature and pressure, the ester linkage is broken and the emulsions become unstable. Consequently, they must be used in neutral or nearly neutral systems. It is well known that in systems containing appreciable amounts of water, it is highly desirable to maintain a distinctly alkaline pH in order to minimize corrosion and corrosive wear.

It has been found and reported in application Serial Number 115,737, filed June 8, 1961, now U.S. Patent Number 3,080,322, that a stable, fire resistant, water-in-oil emulsion can be obtained by emulsifying up to 50 percent water with an oil, using a calcium petroleum sulphonate as the basic emulsifier and selected sodium, potassium, ammonium, lithium, calcium, strontium or barium soaps of naphthenic acids having molecular weights of above about 275 as a stabilizing and anti-wear agent.

I have found that the emulsion reported above can be improved by using sodium, potassium or lithium soaps of naphthenic acids having molecular weights of above about 275 as the stabilizing medium and first reacting an hydroxide or alcoholate of sodium, potassium or lithium with the calcium petroleum sulphonate for a certain time period and at an elevated temperature before adding the naphthenic acids and the remaining ingredients. This method of mixing provides a surprisingly stable emulsion, particularly at high temperature and shows surprisingly low wear in operation. The low wear is most pronounced after lengthy periods of operation.

The object of this invention is to provide a new method of preparing a water-in-oil emulsion for use in circulating systems which provides a more stable emulsion more capable of preventing wear of system parts.

A further object of this invention is to provide a method of preparing a water-in-oil emulsion which has unusual high temperature stability and which has greater resistance to wear under prolonged periods of operation.

These and other objects of this invention will be more fully disclosed in the following detailed description of this invention.

FIGURE 2 shows a plot of Days to Separation of the Emulsion when stored at a temperature of 200° F. vs. Hours of Operation at 175° F. and 1000 p.s.i.

FIGURE 3 shows Wear vs. Hours of Operation.

Figure 1:
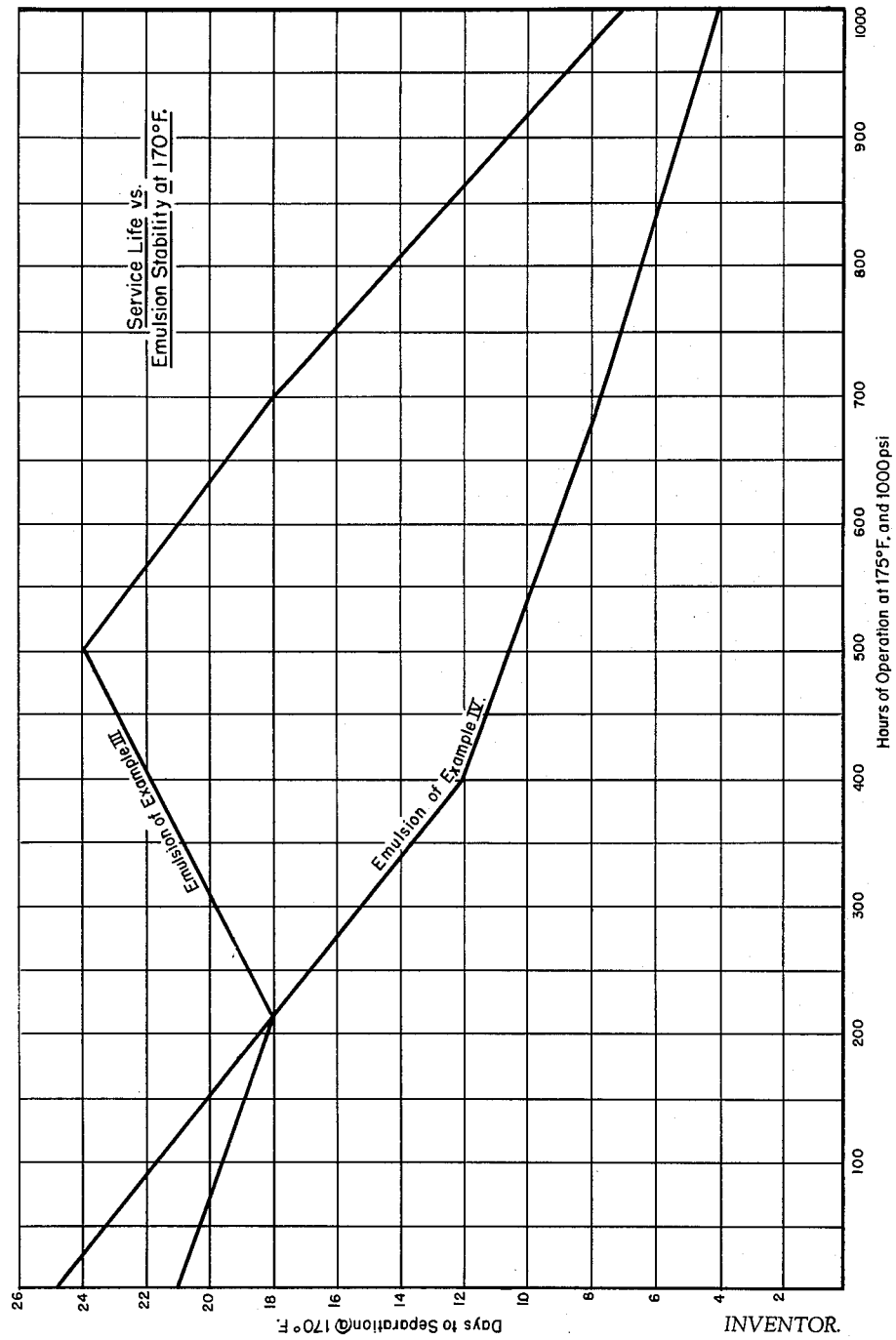
FIGURE 1 shows a plot of Days to Separation of the Emulsion when stored at a temperature of 170° F. vs. Hours of Operation at 175° F. and 1000 p.s.i.

In the formation of these emulsions, the oil used may be any suitable oil of viscosity range from about 50–400 Saybolt Universal Seconds at 100° F. It has been found, however, that a white oil in that range provides unusually good results when using the emulsifying and stabilizing agents of this emulsion. The preferred materials for making oil-soluble sulphonates are those obtained by sulphonation of mineral lubricating oil fractions which may be prepared by any of the well known and accepted methods in this art. The calcium sulphonate used as the basic emulsifier may be present in the blend in the amount of 0.1–5.0 percent by weight of the total blend but preferably about 0.25–2.00 percent by weight can be used to provide entirely satisfactory results. The oil-soluble calcium petroleum sulphonate, while primarily an emulsifying agent, supplies a certain amount of anti-corrosive action and anti-wear protection. The calcium sulphonate should have a molecular weight of at least about 900. When the calcium sulphonate has a molecular weight of about 1000 the emulsification is excellent. Particularly useful calcium sulphonates are Calcium Petronate HMW or Basic Calcium Petronate HMW supplied by Sonneborn and Sons, Inc.

It is found that the emulsion will rapidly deteriorate, especially under the influence of heat, when calcium sulphonate is used alone and, hence, the mixture of calcium sulphonate and oil alone or as the oil phase of the hydraulic fluid is for many purposes not satisfactory. However, unusually stable emulsions are found to occur when naphthenic acid soaps of sodium, potassium, and lithium are used as a stabilizing medium. The molecular weight of the naphthenic acid is found to be critical, naphthenic acids of molecular weight less than 275 being found to possess little or no stabilizing action. Particularly useful are naphthenic acids of about 275–1000 molecular weight. Outstanding results are obtained with naphthenic acids identified as Sunaptic Acid "B" and Sunaptic Acid "C" when using sodium, potassium or lithium as the soap forming ingredient. The "B" acid has a molecular weight of 325 whereas the "C" acid has a molecular weight of 415. The preferred naphthenic acids are those having molecular weights of about 315–500. The concentration of the stabilizing agent in the finished blend may vary from about 0.1–5.0 percent by weight, but preferably should be from about .25–3.0 percent by weight.

In order to insure adequate fire protection, a sufficient amount of water must be properly emulsified into the oil. The water may range from about 10–50 percent of the water-in-oil emulsion; however, a fully acceptable emulsion having excellent fire resisting properties is obtained when the water is about 25–45 percent of the water-in-oil emulsion.

In preparing the emulsion of this invention the oil-soluble calcium petroleum sulphonate must first be reacted with the base, sodium hydroxide, potassium hydroxide or lithium hydroxide, before the naphthenic acid is added. The preferred procedure involves using an amount of the sodium, potassium or lithium hydroxide equivalent to the naphthenic acid used. However, smaller or larger quantities can be used. The amount of potassium hydroxide, sodium hydroxide or lithium hydroxide used will normally be about 0.03–0.25 percent by weight based upon the weight of the final emulsion. A part of the base may be pre-reacted with the oil-soluble calcium sulphonate and improved results will still be obtained. The remainder of the base, sufficient to complete neutralization of the naphthenic acid can then be added later with the remaining ingredients. The results are, however, not as outstanding as when the entire amount of base is pre-reacted with the calcium sulphonate. While the potassium hydroxide, sodium hydroxide or lithium hydroxide is normally employed as an aqueous solution, other solvents, such as alcohols, can be used. Likewise, alcoholates can be substituted for the hydroxides of sodium potassium or lithium. The pre-reaction with the calcium sulphonate is preferably carried out in dilution with the same oil that is used as the base oil for the emulsion, other oils can also be used for this purpose.

The pre-reaction should be carried out in a relatively short time period to avoid oxidative attack on the oil. The time of reaction should be, therefore, within one minute to 60 minutes, depending upon the reaction temperature, with the shorter time periods being used with the higher reaction temperature. The reaction temperature may range from 140–280° F. At 280° F. a reaction period of about one minute is satisfactory whereas at 140° F. at least approximately 30 minutes is required.

EXAMPLE I

As an illustration of the invention, 750 grams of oil-soluble calcium petroleum sulphonate was diluted with 250 grams of mineral oil. This mixture was then heated with 30 grams of a 50% by weight aqueous potassium hydroxide solution to 270° F. while stirring, 10 minutes being required for the heating step. 16.66 grams of this reaction product were dissolved in 274 grams of mineral oil and warmed to 140° F. 2.05 grams of naphthenic acid were added and the mixture was transferred to a Waring Blendor. 208 grams of water at 160° F. were poured into the mixture with the mixer running. An emulsion of excellent dispersion was obtained, having the following formula:

| | Percent by weight |
|---|---|
| Calcium petroleum sulphonate (40–45% active, molecular weight, about 1000) | 2.50 |
| Potassium hydroxide | .05 |
| Paraffin oil (105″ at 100° F., 95 V.I.) | 55.50 |
| Naphthenic acid (415 molecular weight) | .41 |
| Water | 41.54 |
| | 100.00 |

The stability of this emulsion was 19 days to complete separation at 170° F. As a comparison, the same ingredients were used but the potassium hydroxide was first reacted with the naphthenic acid before the calcium sulphonate was added, followed by addition of the remaining oil and water. This emulsion showed complete separation at 170° F. in 11 days. While both emulsions were unusually stable considering the elevated storage temperature the emulsion prepared by the method of this invention was obviously superior.

EXAMPLE II

In this example only part of the potassium hydroxide needed to neutralize the naphthenic acid in the final composition was used for pre-reaction of the calcium sulphonate. Also, the naphthenic acid content of the final composition was raised to 0.7% by weight and the potassium hydroxide content increased accordingly. Another 16.66 grams of the pre-reaction preparation disclosed in Example I (equivalent to 2.5% calcium petroleum sulphonate based on finished emulsion) were dissolved in 100 grams of mineral oil and 3.5 grams (0.7% by weight of the finished emulsion) of naphthenic acid were added. This mixture was heated while stirring with 1.77 grams of 10% by weight aqueous potassium hydroxide solution during 10 minutes to 260° F. and then immediately quenched by adding the balance of the base oil (174 grams). This mixture was transferred to a Waring Blendor. 208 grams of water (41.5% of the final emulsion) at 160° F. were poured into the mixture with the Blendor running. A finely dispersed emulsion of good stability resulted. When stored in a container at 200° F., complete separation did not occur until 18 days had passed, showing unusual stability for such a high temperature. As a comparison, the same ingredients were used but the potassium hydroxide was first reacted with the naphthenic acid before the calcium sulphonate was added, followed by addition of the remaining oil and water. This emulsion showed complete separation of 200° F. in 11 days.

EXAMPLE III

A 2,500 gallon plant batch of the emulsion fluid was prepared in accordance with the method of this invention, with all the potassium hydroxide pre-reacted with the calcium sulphonate. This batch contained 2.5% by weight calcium sulphonate (40% active, M.W. 415, acid No. 122), 0.09% potassium hydroxide (90% active), 0.5% of an alkylated diphenylamine (Agerite Stalite), 54.61% mineral oil (105 sec. at 100° F., 95 V.I.) and 41.6% water. Thirty percent of the total mineral oil was charged to a kettle and heated to 150° F. during 25 minutes. Then the calcium petroleum sulphonate was added while stirring. Next, the potassium hydroxide dissolved in twice its weight of water was added and the temperature raised to 260° F. during 50 minutes. After reaching this temperature the reaction mixture was immediately quenched by adding the balance of the mineral oil. The temperature was maintained at 140–150° F. while the naphthenic acid and the alkylated diphenylamine were added. The water, previously heated to 160° F., was stirred into the mixture and the resulting emulsion was homogenized by passing it twice through a Manton Gaulin homogenizer at 3,000 p.s.i. and 150–160° F. This emulsion was tested for wear and separation tendencies by running it in a Vickers test stand for a prolonged time, i.e. 1000 hours at a pressure of 1000 p.s.i. and temperature of 175° F. Samples were taken during the run and the stability against separation was determined by storing the samples in ovens, respectively maintained at 170° F. and 200° F. Stability was measured by noting the number of days required until separation was complete. The results of this test are plotted on FIGURES 1, 2 and 3.

EXAMPLE IV

The same ingredients used in Example III were used but the potassium hydroxide was reacted with the naphthenic acid before being mixed with the calcium sulphonate. The results of this test are also plotted on FIGURES 1, 2 and 3. It is seen that the method of this invention provides a much more stable emulsion.

EXAMPLE V

During the runs of Examples III and IV the parts of the pump under test on the test emulsions were weighed and these results are shown on Table I which follows. The wear results from these tests are plotted on FIGURE 3, as well as in Table I. These results show that mixing the emulsion in accordance with the teaching of this invention results in far less wear of the pump parts.

*Table I*

WEAR DATA ON EXAMPLES III AND IV

[Test Conditions: Vickers pump 2 gal./min. at 175° F. and 1,000 p.s.i.]

|  | Weight Loss (mg.) | | | | |
| --- | --- | --- | --- | --- | --- |
|  | 100 Hrs. | 300 Hrs. | 500 Hrs. | 750 Hrs. | 1,000 Hrs. |
| Example III: | | | | | |
| Vanes | 8.4 | 16.5 | 21 | 26.6 | 34.4 |
| Ring | 31.9 | 57.5 | 68.5 | 72.4 | 85.4 |
| Total | 40.3 | 74.0 | 89.5 | 99.0 | 119.8 |
| Example IV: | | | | | |
| Vanes | 7.8 | 13.6 | 19.3 | 25.5 | 1,123.7 |
| Ring | 38.5 | 65.7 | 80.1 | 105.0 | 227 |
| Total | 46.3 | 79.3 | 99.4 | 130.5 | 1,350.7 |

Of course certain additional materials can be added to the formulations of this invention in small quantities for specific improvement, such as oxidation prevention or the like, without disturbing the effectiveness of the composition as a lubricant or fire-resistant hydraulic fluid.

The examples given hereinabove are merely for the purpose of illustrating the invention. They are not intended to limit the scope of the invention, the only limitations being those contained in the attached claims.

I claim:

1. A stable water-in-oil emulsion possessing improved anti-wear characteristics obtained by dispersing from about 0.1 to about 5.0% by weight of an oil soluble calcium petroleum sulfonate in mineral oil, dispersing from about 0.03 to about 0.25% by weight of an alkaline compound selected from the group consisting of sodium hydroxide, potassium hydroxide and lithium hydroxide in water, mixing the two dispersions intimately and maintaining the mixture at an elevated temperature in the range of 140° to 280° F. for a period of from about 1 to about 60 minutes, mixing mineral oil and naphthenic acid having a molecular weight of at least 275, sufficient to provide from about 0.1 to about 5.0% by weight of metal naphthenate, with the reaction mixture at the elevated temperature while stirring and adding water at the elevated temperature to the mixture with vigorous agitation to produce a stable water-in-oil emulsion.

2. The method of preparation of a water-in-oil emulsion which comprises: dispersing from about 0.25% to about 2.0% by weight of an oil soluble calcium petroleum sulfonate in mineral oil, dispersing from about 0.03% to about 0.25% by weight of an alkali compound selected from the group consisting of sodium hydroxide, potassium hydroxide and lithium hydroxide in a solvent selected from the group consisting of water and liquid alcohols in which the alkali compound is soluble, mixing the two dispersions intimately and maintaining the mixture at an elevated temperature of from about 140° to 280° F. for about 1 to about 60 minutes sufficient to effect an initial reaction, mixing mineral oil and an amount of naphthenic acid, having a molecular weight of at least 275, sufficient to provide up to about 5% by weight of a metal naphthenate, with the reaction mixture while stirring, and then adding water at the elevated temperature with vigorous agitation whereby a stable water-in-oil emulsion is formed.

3. The method of preparation of a water-in-oil emulsion which comprises: dispersing from about 0.1 to about 5.0% by weight of an oil soluble calcium petroleum sulfonate in mineral oil, dispersing from about 0.03 to about 0.25% by weight of an alkali compound selected from the group consisting of sodium hydroxide, potassium hydroxide and lithium hydroxide in a solvent selected from the group consisting of water and liquid alcohols in which the alkali compound is soluble, mixing the two dispersions intimately and maintaining the mixture at an elevated temperature of from about 140° to 280° F. for about 1 to about 60 minutes sufficient to effect an initial reaction, mixing mineral oil and an amount of naphthenic acid, having a molecular weight of at least 275, sufficient to provide from about 0.1 to about 5% by weight of a metal naphthenate, with the reaction mixture while stirring, and then adding water at the elevated temperature with vigorous agitation whereby a stable water-in-oil emulsion is formed.

4. The method of claim 3 wherein a further amount of said alkaline compound is added after the mixing of said mineral oil and said naphthenic acid the total amount of alkaline compound added being maintained in the range of about 0.03% to about 0.25% by weight of the emulsion.

5. The method of preparation of a water-in-oil emulsion which comprises: dispersing from about 0.1 to about 5.0% by weight of an oil soluble calcium petroleum sulfonate in mineral oil, dispersing from about 0.03 to about 0.25% by weight of an alkali compound selected from the group consisting of sodium hydroxide, potassium hydroxide and lithium hydroxide in water, mixing the two dispersions intimately and maintaining the mixture at a temperature of from about 140° to 280° F. for about 1 to about 60 minutes sufficient to effect an initial reaction, mixing mineral oil and an amount of naphthenic acid, having a molecular weight of at least 275, sufficient to provide from about 0.1 to about 5% by weight of a metal naphthenate, with the reaction mixture while stirring, and then adding water at a temperature of from about 140° to 280° F. with vigorous agitation whereby a stable water-in-oil emulsion is formed.

6. The method of preparation of a water-in-oil emulsion which comprises: dispersing from about 0.1 to about 5.0% by weight of an oil soluble calcium petroleum sulfonate in mineral oil, dispersing from about 0.03 to about 0.25% by weight of potassium hydroxide in an aqueous solution, mixing the two dispersions intimately and maintaining the total mixture at a temperature of from about 140° to 280° F. for a period of from about 1 to about 60 minutes, mixing mineral oil and an amount of naphthenic acid, having a molecular weight of at least 275, sufficient to provide from about 0.1 to about 5.0% by weight of metal naphthenate, with the reaction mixture at a temperature of from about 140° to about 280° F. while stirring, adding water at an elevated temperature to the mixing with vigorous agitation whereby a stable water-in-oil emulsion is formed.

References Cited by the Examiner

UNITED STATES PATENTS 3,080,322   3/1963   Holzinger et al. _____ 252—75

JULIUS GREENWALD, *Primary Examiner.*